(12) United States Patent
Hoffmeister et al.

(10) Patent No.: US 9,396,085 B2
(45) Date of Patent: Jul. 19, 2016

(54) DATA ACCESS LOGGING

(71) Applicants: Fritz Hoffmeister, Heidelberg (DE); Otto Boehrer, Wiesloch (DE); Frank Gales, Speyer (DE); Florian Chrosziel, Walldorf (DE); Jona Hassforther, Heidelberg (DE); Thomas Kunz, Lobenfeld (DE); Stefan Rossmanith, Walldorf (DE); Marco Rodeck, Maikammer (DE); Rene Zink, St. Leon Rot (DE)

(72) Inventors: Fritz Hoffmeister, Heidelberg (DE); Otto Boehrer, Wiesloch (DE); Frank Gales, Speyer (DE); Florian Chrosziel, Walldorf (DE); Jona Hassforther, Heidelberg (DE); Thomas Kunz, Lobenfeld (DE); Stefan Rossmanith, Walldorf (DE); Marco Rodeck, Maikammer (DE); Rene Zink, St. Leon Rot (DE)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 13/679,863

(22) Filed: Nov. 16, 2012

(65) Prior Publication Data
US 2014/0143221 A1    May 22, 2014

(51) Int. Cl.
G06F 17/30 (2006.01)
G06F 11/30 (2006.01)

(52) U.S. Cl.
CPC ........ *G06F 11/3072* (2013.01); *G06F 11/3034* (2013.01); *G06F 17/30368* (2013.01)

(58) Field of Classification Search
CPC .................. G06F 17/30864; G06F 17/30867; G06F 17/30539
USPC .......................................... 707/781, 758, 776
See application file for complete search history.

(56) References Cited

U.S. PATENT DOCUMENTS

| | | | |
|---|---|---|---|
| 6,253,203 B1* | 6/2001 | O'Flaherty et al. | |
| 6,757,690 B2* | 6/2004 | Aldrich et al. | 707/702 |
| 8,671,455 B1* | 3/2014 | Zhu et al. | 726/26 |
| 8,713,170 B2* | 4/2014 | Cyr et al. | 709/224 |
| 2003/0093576 A1* | 5/2003 | Dettinger et al. | 709/313 |
| 2004/0153878 A1* | 8/2004 | Bromwich | G06F 11/3636 714/48 |
| 2004/0205043 A1* | 10/2004 | Alessi et al. | 707/2 |
| 2008/0159146 A1* | 7/2008 | Claudatos et al. | 370/235 |
| 2009/0177675 A1* | 7/2009 | Trumbull | G06F 21/552 |

* cited by examiner

*Primary Examiner* — Rehana Perveen
*Assistant Examiner* — Loc Tran
(74) *Attorney, Agent, or Firm* — Mintz Levin Cohn Ferris Glovsky and Popeo, P.C.

(57) ABSTRACT

Data characterizing a plurality of data accesses of objects at one or more log points is received by a data access framework. Thereafter, data accesses requiring logging are identified and one or more corresponding pre-specified attributes are then logged. Related apparatus, systems, techniques and articles are also described.

19 Claims, 6 Drawing Sheets

DATA ACCESS LOGGING

TECHNICAL FIELD

The subject matter described herein relates to the logging of disclosure of data, for example, via read and write accesses, from various requesting entities.

BACKGROUND

Enterprises are increasingly monitoring which entities (e.g., computing systems, individuals) access their data. Not only is such monitoring required to comply with various laws and regulations, but such monitoring can be used for other purposes such as data security which focuses on the confidentiality of certain data and also protects its integrity (against manipulation, etc.). Authorizations can control restrictions established for read and write access to confidential data. Data access logging, in this context, can be used to protocol access and to detect unauthorized access.

Data access can also be monitored in an effort to protect personal information of users. In addition to maintaining the integrity of users' personal data, access to such data must be restricted in order to comply with various health and privacy laws.

Furthermore, data access monitoring can be used for data classification purposes with various data having different levels of confidentiality. The classification is related to the content only. It is not derivable from technical/formal attributes or the data type.

SUMMARY

In one aspect, data characterizing a plurality of data accesses of objects at one or more log points is received by a data access framework. Thereafter, data accesses requiring logging are identified and one or more corresponding pre-specified attributes are then logged.

The data accesses can be, for example, read accesses and/or write accesses. The data accesses requiring logging can be identified by checking whether data access logging is enabled for a corresponding object and a logical system (e.g., SAP client) that initiated the corresponding data access. In addition, for each data access, fields that should be logged for the data access can be determined and corresponding values can be logged.

In some variations, fields that are required for condition evaluation are determined for evaluation of logging conditions and for being logged, based on a pre-defined rule set. Corresponding values can then be logged. The pre-defined rule set can be specified by log configuration settings. The log configuration settings can be generated using at least one configuration template.

The logging can include storing values (e.g., numbers, field names, etc.) for the determined fields in at least one buffer and/or data store. Stated differently, the logging can, in some cases, simply identify the accessed fields, while in other implementations, the logging can identify both the accessed fields and corresponding values for same. The buffered values can be asynchronously transferred to at least one data store. In addition, reports can be generated and presented that characterize the stored values.

The log points can originate from at least one channel from the system containing sensitive data to the outside world. When data is transferred through this channel, it is disclosed. At least one channel can be a remote application programming interface (API) channel with the corresponding log points for the remote API channel being at a client upon initiating a request to a server, at the server upon receiving the request from the client, at the server upon responding to the request from the client, and/or at the client receiving the response from the server. At least one channel can be a user interface channel with corresponding log points at a backend server after receiving an event from a user interface, and/or at the backend server after responding to the event from the user interface. The user interface channel can be a graphical user interface, an audio channel, and/or an audiovisual channel.

In some variations, mass configuration can be provided in which an existing read access log configuration of an entity (e.g., a web service or a screen) can be used as a template for the configuration of other entities (target entity). Matching data access log configurations can be identified by comparing types or structures of elements/parts of the entities and such matches can be copied from the template entity to the target entity. Such access log configurations can be used to specify the pre-specified attributes to be logged.

Computer program products are also described that comprise non-transitory computer readable media storing instructions, which when executed by at least one data processor of one or more computing systems, causes the at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. In particular, the current subject matter is advantageous in that it enables customers to comply with varying legal and privacy requirements relating to read/write accesses of data by logging data characterizing such read/write accesses and allowing subsequent viewing/review of such accesses for only specified purposes.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to the monitoring and logging of accesses of data. Such data access monitoring can serve various purposes such as providing data security, data privacy, and data classification. With data security, the main goal is to protect the interests of a company. The focus is confidentiality and protection against manipulation of data. Authorizations restrict the read and write access to confidential data. Data access logging as described herein can be used to protocol access and to detect unauthorized access. With regard to data privacy, the current subject matter can be used to ensure that a person's personal/sensitive information is not made available to unauthorized users. With regard to data classification, the current subject matter enables different levels of confidentiality (i.e., classes of confidentiality) which are derivable from the content of such data and not its technical/formal attributes or data type.

Figure 1:
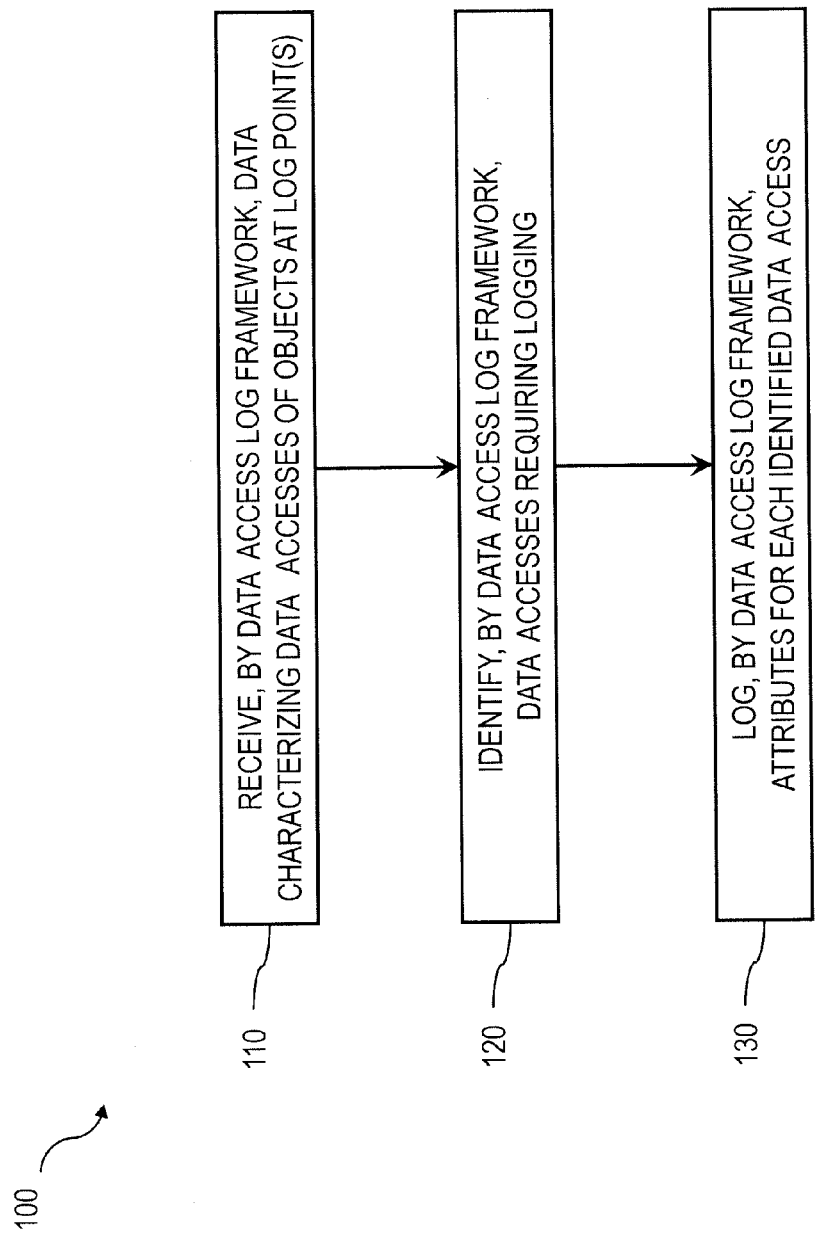
FIG. 1 is a process flow diagram illustrating data access logging in accordance with at least one embodiment.

FIG. 1 is a process flow diagram 100 in which, at 110, data comprising a plurality of data accesses of objects at one or more log points are received by a data access log framework. Thereafter, at 120, it is determined whether at least a portion of the data accesses require logging. Subsequently, at 130, one or more pre-specified attributes for each data access that is determined to require logging is then logged. In some implementations, the received data can comprise both data requiring logging as well as data not requiring logging. In other implementations, the data not requiring logging can be filtered out.

Figure 2:
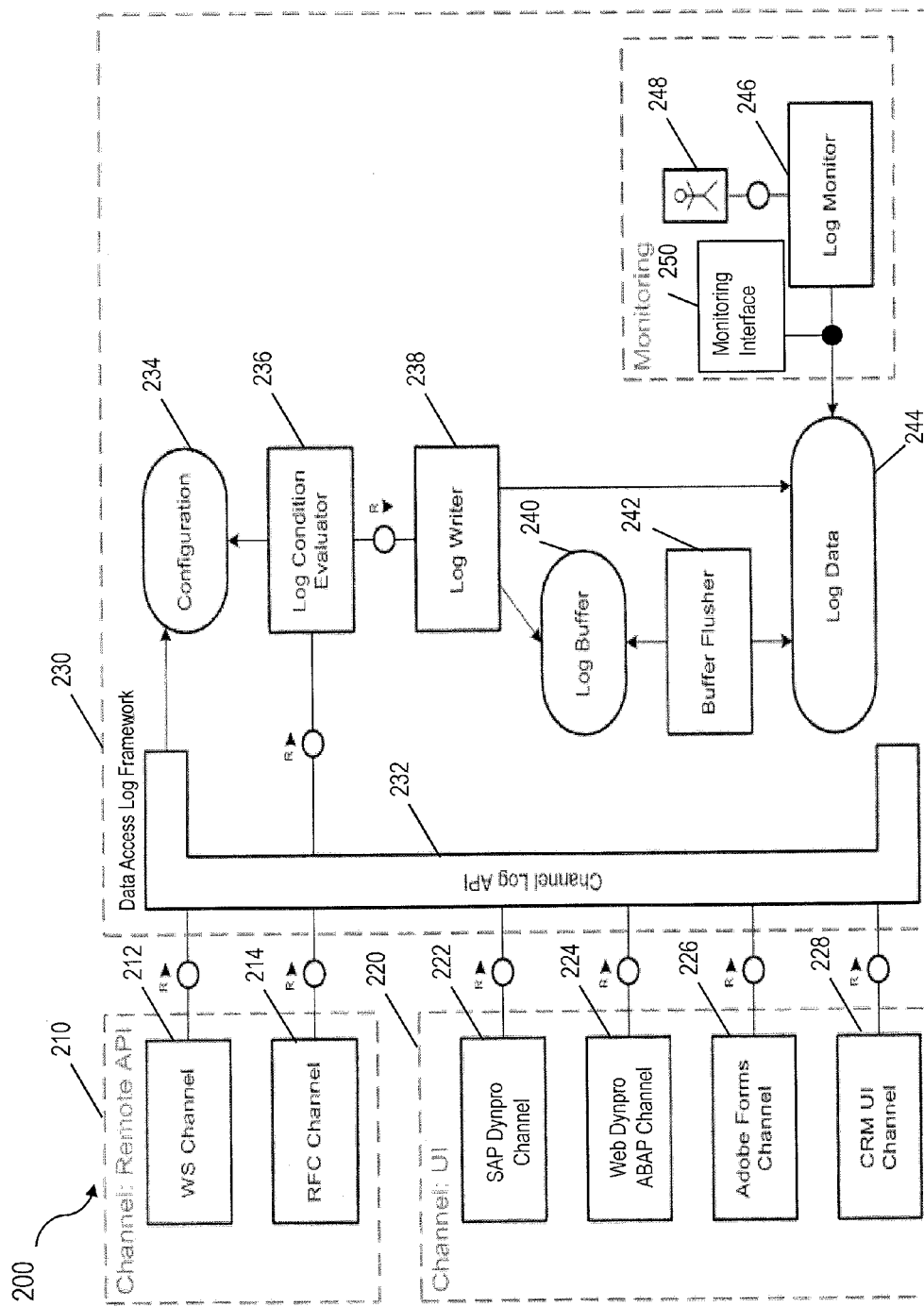
FIG. 2 is a diagram illustrating an architecture that provides data access logging in accordance with at least one embodiment.

FIG. 2 is a diagram 200 in which a data access log framework 230 can log read accesses from various channels including remote application programming interfaces (APIs) 210 as well as user interfaces 220. The remote APIs 210 can include channels such as web services 212 and/or remote function calls (RFCs) 214 and the like. The user interface channels 220 can include SAP Dynpro 222, Web Dynpro ABAP 224, Adobe Forms 226, customer relationship management (CRM) user interfaces 228 and the like.

The data access log framework 230 can include a channel log API 232 that provides an interface with the various channels 210, 220. A configuration module 234 can provide various configuration settings (rules, filters, etc.) that can be attached to various types of data accesses (e.g., read and/or write accesses, etc.) (as will be explained in further detail below). A log condition evaluator 236, using the configuration settings from the configuration module 234, can determine whether a particular data access requires logging. Data characterizing the data access can be persisted, by a log writer 238, into a log buffer 240 and/or into a log data store 244. The log buffer 240 can be used store data in order to increase performance. Data stored in the log buffer 240 can be asynchronously written (via a buffer flusher 242) to the log data store 244. The log data store 244 can be coupled to a log monitor 246 which in turn can be accessed by users at a client 248.

Figure 3:
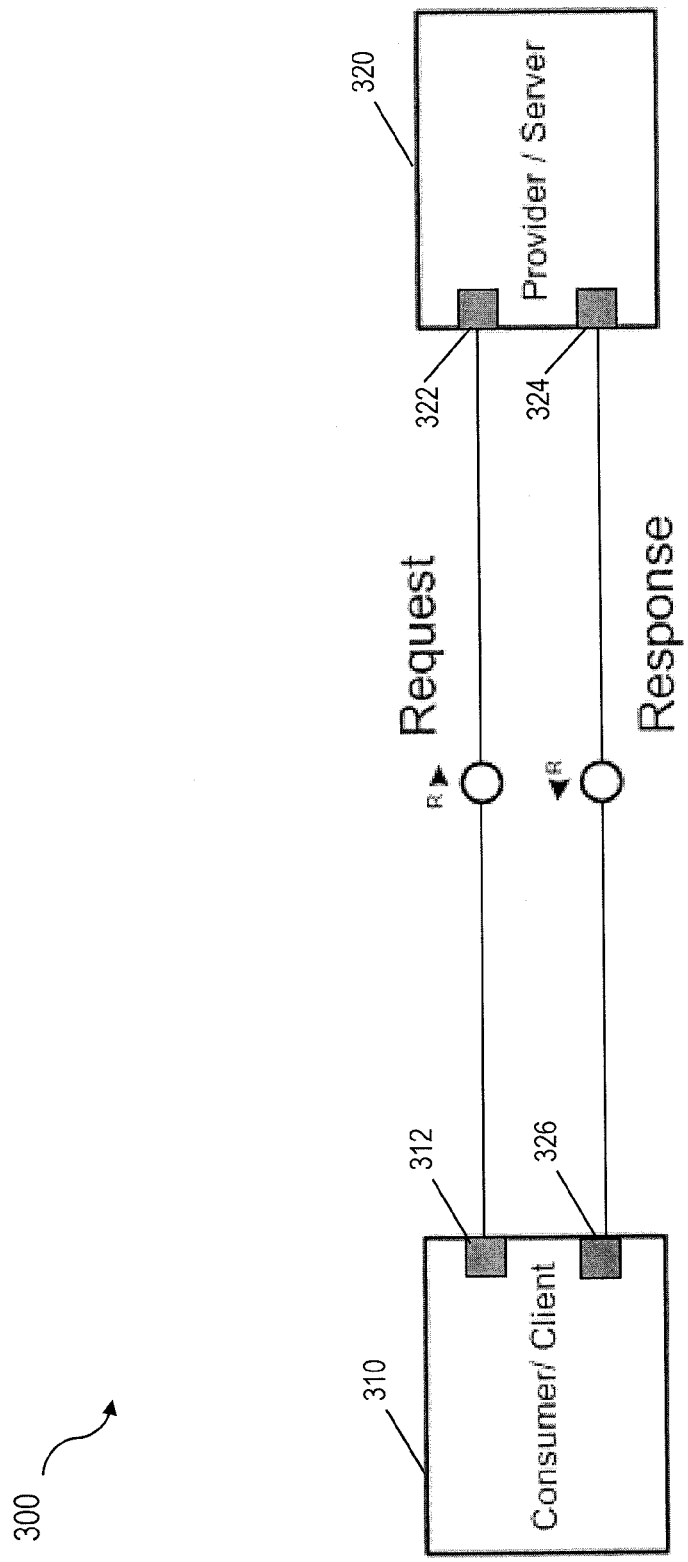
FIG. 3 is a diagram illustrating log points in a remote API channel in accordance with at least one embodiment.

Data accesses can be identified at various points within a particular data orchestration. FIG. 3 is a diagram 300 that shows interactions between a consumer/client 310 and a provider/server 320. A first data access agent 312 (which acts as a listener to identify and record data relating to a data access) can be part of the consumer/client 310 and can be triggered upon disclosure of data in a request sent to the provider/server 320. In addition, a second data access agent 322 can form part of the provider/server 320 and can be triggered upon receipt of the request from the consumer/client 310. Similarly, a third access agent 324 can form part of the provider/server 320 and can be triggered upon provision of a response (disclosing sensitive data) to the consumer/client 324. A fourth access agent 326 can from part of the consumer/client 310 and can be triggered upon receipt of the response (disclosing sensitive data) from the provider server 320. While FIG. 3 illustrates an arrangement with four data access log points 312, 322, 324, 326 it will be appreciated that any combination of one or more agents can be utilized depending on the desired configuration. The data access log points 312, 322, 324, 326 can form part of the remote APIs channels 210 and can access the data access log framework 230 by way of the channel log API 232.

Figure 4:
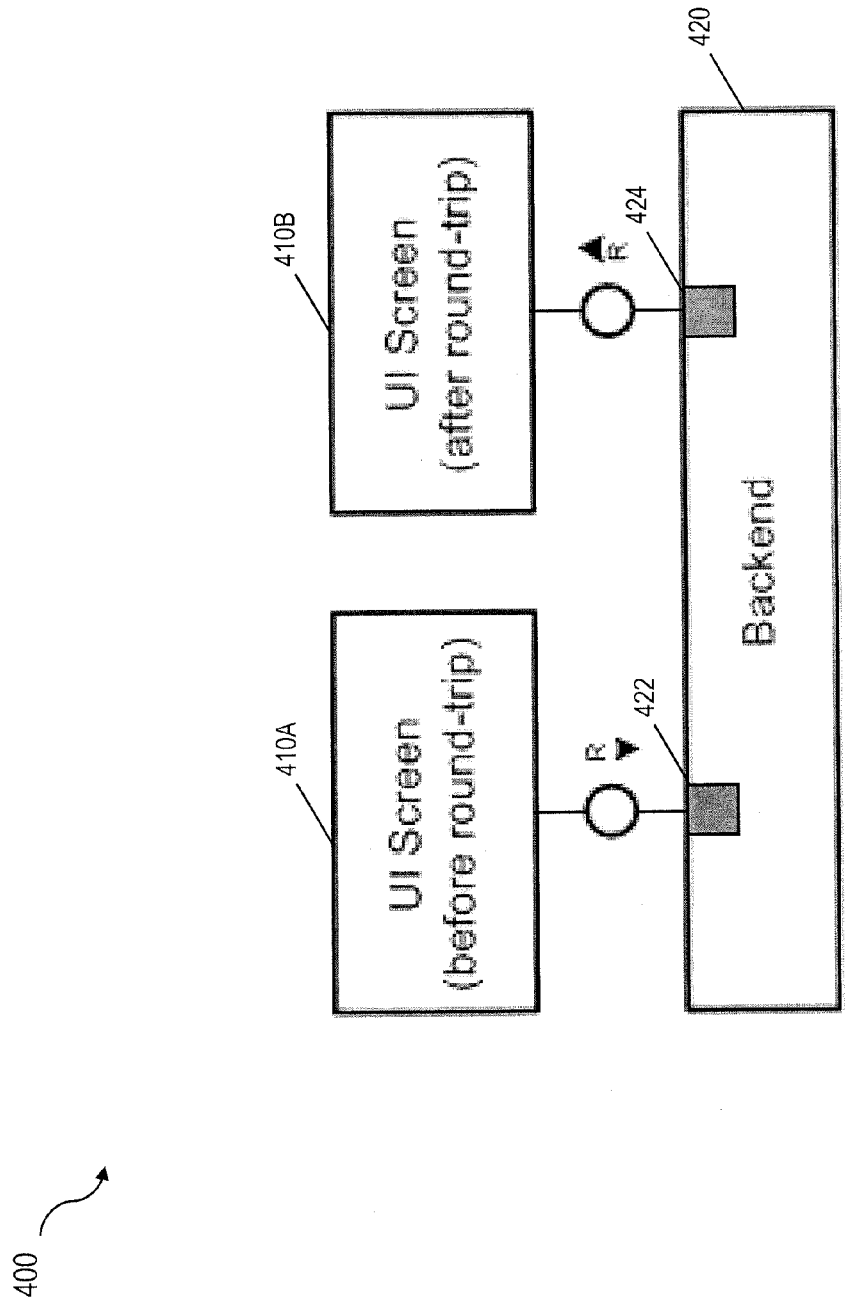
FIG. 4 is a diagram illustrating log points in a user interface channel in accordance with at least one embodiment.

FIG. 4 is a diagram that illustrates a user interface screen in two states 410A, 410B and how such a screen can interact with a backend system 420. An action, such as activation of a graphical user interface element on the user interface screen 410A, results in an event being detected/transmitted to the backend system 420 which in turn results in a response to such event being provided/transmitted to the user interface screen 410B (which may or may not result in such screen being rendered in a different manner). A first data access log point 422 can detect the event when it is first detected/transmitted to the backend system 420 and/or a second data access log point 424 can detect the response (disclosing sensitive data) being provided/transmitted to the user interface. The data access log points 422, 424 can form part of the user interface channels 220 and can access the data access log framework 230 by way of the channel log API 232.

As noted above, the current subject matter can be used to comply with legal requirements relevant for data access logging, especially as there are an increasing number of diverse laws and regulations regarding data security, data privacy, and data classification. There may be different legal requirements for different purposes. For example, the data which is logged is different (e.g., in the USA, a user's social security number must not be logged—in this case, it has to instead be logged that a certain user had access to the social security number (but not the value of the social security number)). In addition, the logged data can be logged for one purpose but can be prohibited in relation to a different purpose (e.g., storing user related data for security purposes may not allowed for data privacy purposes, etc.). In addition, retention requirements with regard to logged accessed data can vary as well as the usage of such data (i.e., the data can only be used for a specified purpose, etc.); as such, the current subject matter enables the purpose of logged data to be preserved/identified.

The various data access log points 312, 322, 324, 422, 424 can be used to log both read and write accesses (which can comprise a query and a result which can sometimes be empty). The log writer 238 can cause various attributes to be logged either in the log buffer 240 or the log data store 244. Example, but not limiting, attributes include:

User accessing the data
Date, time
Access environment
  a. Environment (e.g., program name, transaction name, application name, software component)
  b. Channel object name (e.g., name of web service, name of remote enabled function module, name of SAP Dynpro screen)
  c. Channel type (e.g., web service, remote function call, SAP Dynpro)
Parameter for subsequent processing
  a. Purpose for writing the log
  b. Configuration key of the rule/filter related to the log record
Query (selection criteria, requested data)
  a. Log domain
    Grouping of fields belonging together from a semantic point of view (e.g. account=account number+bank code number or just fields with different names but same semantic)
  b. Field name
    Unique within access environment (e.g., fieldname F1 related to data element D1, technical field name F2 of screen S1 in program P1).
  c. Field value
    The query can comprise many fields and corresponding values. A field value can be part of a log record. This can be controlled via configuration. If a query shall be logged, the identifying attribute values shall be part of the log record.
Result
The result can comprise the log domain, the field names and corresponding values. A field value can be part of a log record. This can be controlled via configuration. If a result shall be logged, the corresponding log record shall be linked to the related query log record.

Data Access Status

For later analysis of the logged data it is important to know whether a data access was successful or not. Therefore, the data access status is recorded as well. This could be, for example, a system message (e.g. indicating that a user is not allowed to access the data) or a SOAP fault message.

Correlation ID

For a Remote API channel, the request and response log records can be correlated. For a UI channel, the log records for access sequences spanning over multiple screens can be correlated. Examples for the UI channel include scenarios in which the account number only exists on the first screen and not on the subsequent screen. When creating logs for the subsequent screen it should behave in the same way like the account number would exist there as well, i.e., if logging is enabled for a certain account number, the logging shall be enabled on the subsequent screen as well and when doing reporting for a certain account number, the log data created on the subsequent screen shall be contained as well.

In addition, IP addresses of environments triggering the data access can be logged. Furthermore, attributes that simplify the selection of logged data or attributes which allow the authorization management when accessing the logged data can also be logged (i.e., a log record can be extended by the application component and the software component of the underlying channel object (e.g., a concrete screen or a remote API such as a web service) so that such logged data can be found via queries based on such parameters). Still further, the legal entity (owner) of the logged data (e.g., the related application) can be recorded.

In some cases, attributes detected by a read access log point 312, 322, 324, 326, 422, 424 need not be logged. For example, attributes do not need to be logged when corresponding change documents already exist and/or if confidentiality requires that such attributes are not logged. Example of attributes that may, in some cases, not be logged include: authorizations assigned to a user, passwords, social security numbers, private keys of certificates, session cookies, and specific short or long text in case of read access (because there can be fixed text like "read access to the following entity happened" in addition to the concrete logging attributes described above).

The examples described above with regard to the remote API channel 210 and the user interface channel 230 are illustrative and should not be construed as being required or limiting. The current data access logging approach can cover the data access to all entities in a system (e.g., an ERP system), independent of whether it is triggered via remote API or UI. The log writing may not be done in the application but in the underlying frameworks instead. For example, all UI frameworks and remote API frameworks can be enabled for data access logging.

Various configurations of data access logging can be handled by the configuration module 234. A configuration setting (which can sometimes be characterized as a rule and/or filter) can comprise: channel (i.e., the channel from which the read access originated), technical attributes (e.g., name of a service, name of an operation, etc.), involved legal entities, and purpose, among others. Stated differently, the configuration setting can specify the accessed fields to be logged and whether the corresponding information in such fields should be logged.

Data access logging can be selectively switched on/off (i.e., activated/deactivated) by entities (e.g., SAP client) providing the accessed data. The action of switching can also be logged (e.g., date, time, user, etc.). In cases in which logging is switched on for a given entity providing the accessed data, the specific configuration settings of that entity (e.g., SAP client) (rules/filters) can be active. The specific configuration or portion thereof (rules/filters) can be provided as part of the application as initial proposals (i.e., they are part of the application platform, etc.) or they can be customized/generated by the ultimate end user.

In cases in which logging is switched on, a user can further restrict the logging via a Business Add in (BAdI) call. For example, logging can be restricted for a particular business partner. If the customer restricts the logging further via BAdI, this restriction can be recorded (in the internal control system).

In some implementations, distribution of logging configurations can be provided. Distribution can be performed via customizing transport or using a central configuration approach. During such distribution, logging configurations can be protected against reading and manipulation. Existing distribution routes (i.e., transport paths) can be reused, provided that, however, protection against unauthorized reading and manipulation is prevented via various safeguards along such routes.

The current subject matter provides data access logging in such a fashion as to avoid or minimize the consumption of processing resources or otherwise negatively affect performance. The log writer 238, during runtime, determines, based on configuration, which fields must be logged to fulfill country specific legal requirements (using, for example, the legal entity). In some cases, runtime optimization can be provided by logging raw data with an asynchronously decoupled filtering for the final logging data. In some cases, a log buffer 240 can be used to provide runtime optimization.

The log data store 244 can store data in a variety of ways and can selectively allow access to such data. For example, the log data store 244 can be wholly or partially encrypted and/or access can require a user to sign in (which, in turn, is logged). For log reports via the log monitor 246, specific authorizations can be provided based, for example, on the corresponding legal entity or purpose. Data in the log data store 244 can be copied during a system/client copy procedure.

Logged data can be retained by and/or archived from the log data store 244 based on user configurations (which can be based, for example, on country/legal entity and/or purpose). In cases where performance of reading and analyzing logged data is not necessary, then the archived data can be utilized (because it can be stored using a less expensive and slower but reliable database technology). A monitoring interface 250 disposed between the log data module 244 and the log monitor 246 can be used for reporting (e.g., purpose-specific reporting, etc.). Using the log monitor 246, users 248 can search for attributes (i.e., non-key fields, etc.) within the log data store 244. In addition, the log monitor 246 can employ automated pattern recognition and random sampling of suspicious accesses. In cases in which accesses are indicative of being unauthorized, various alerting mechanisms (e.g., e-mail, messaging, visual displays, audio alerts, voice calls, etc.) can be employed. The log monitor 246 can restrict access to reports and/or to the data stored in the log data store 244 based on specified authorization restrictions and the like. Via the interface 250, it is also possible to transfer the logged data into a column based database for having fast analytical access to all attributes of the logged data.

Figure 5:
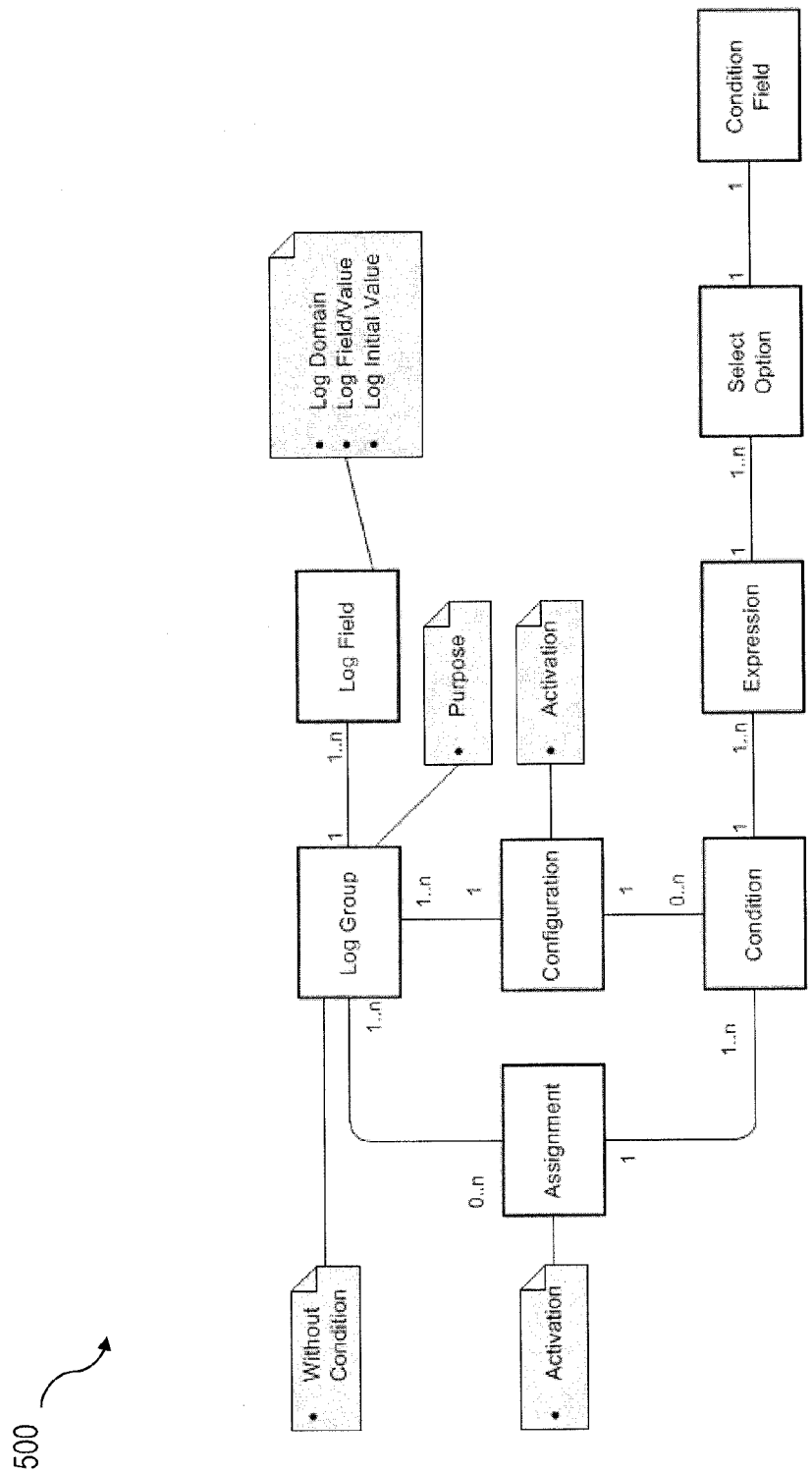
FIG. 5 is a diagram illustrates data structures for rule based configuration in accordance with at least one embodiment.

FIG. 5 is a diagram 500 illustrating a rule based configuration as used by the configuration module 234. A configuration for one specific channel entity (e.g. web service, function module, UI screen) can comprise: a set of fields/elements with attached attributes. The attributes can specify (a) to which log domain the field/element is assigned to, (b) if the field/element value shall be logged in addition to the field/element name in case this field/element was accessed, and/or (c) if the field/element shall be logged at all (in cases during runtime there is no value is assigned to a certain field/element, the data access might not need to be logged). The log domain can group technically different but semantically identical fields/elements or group fields/elements which belong together from semantic point of view (e.g., account number, bank code). The log domain can simplify monitoring of logged data based on descriptive aliases instead of technical non-harmonized field/element names. A set of log fields/elements of a specific channel entity can be grouped as a log group for assigning a purpose and specifying if the logging shall be done without conditions. A condition can be characterized as a conjunctive normal form as illustrated in diagram 600, i.e., many expressions can be logically linked with OR. Each expression can consist of many select options which are logically linked with AND. Each select option refers to one field/element only and can consist of many operations (comparison statements). An operation consists of a field/element name and operator (e.g. EQ, CP) and a value (e.g. F1=V1). A configuration can comprise one or many log groups. A log group can be assigned to many conditions. This assignment can be active or inactive. The configuration itself can be active ore inactive as well.

Figure 6:
FIG. 6 is a diagram illustration a condition and expression as part of a rule based configuration in accordance with at least one embodiment.

FIG. 6 is a diagram 600 illustrating a sample condition and associated expression.

In some implementations, mass configuration can be provided in which an existing read access log configuration of an entity (e.g., a web service or a screen) can be used as a template for the configuration of other entities (target entity). Matching data access log configurations can be identified by comparing types or structures of elements/parts of the entities and such matches can be copied from the template entity to the target entity.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, functional programming languages, logical programming languages, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices including tablet computers may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. A computer-implemented method comprising:
  receiving, by a data access log framework, data characterizing a plurality of data accesses of objects at one or more log points originating from at least one channel;
  identifying data accesses requiring logging by:
    first determining, for each data access by a log writer during runtime, which fields should be logged for the data access to fulfill country specific legal requirements,
    second determining, after the first determining, if values should be logged for the determined fields, and
    logging the determined fields and the determined values;
  logging one or more pre-specified attributes for each identified data access requiring logging, the attributes including a purpose of the logging, a configuration key of a filter associated with the logging, and a log domain for grouping semantically identical determined fields; and
  determining, using at least one of an automated pattern recognition and a random sampling, that at least one data access in the plurality of data accesses represents an unauthorized data access, and generating an alert indicative of the unauthorized data access, wherein at least one authorization restriction is used to restrict access to at least one logged data access;
  wherein the at least one channel is a user interface channel, and wherein corresponding log points for the user interface channel comprise both: at a backend server after receiving an event from a user interface, and at the backend server after responding to the event from the user interface.

2. A method as in claim 1, wherein the data accesses are read accesses.

3. A method as in claim 1, wherein the data accesses are write accesses.

4. A method as in claim 1, wherein the identifying comprises:
checking, for each data access, whether data access logging is enabled for a corresponding object and an entity providing the accessed data.

5. A method as in claim 1, wherein
the identifying further comprises:
determining which fields are required for condition evaluation;
determining, using a pre-defined rule set, whether the determined fields require logging; and
further comprising:
logging values for the determined fields.

6. A method as in claim 5, wherein the pre-defined rule set is specified by log configuration settings.

7. A method as in claim 6, wherein the log configuration settings are generated using at least one configuration template.

8. A method as in claim 1, wherein the logging comprises:
storing values for the determined fields in at least one data buffer and/or data store.

9. A method as in claim 8, further comprising:
asynchronously transferring the buffered values to at least one data store.

10. A method as in claim 8, further comprising:
generating at least one report based on the stored values.

11. A method as in claim 1, wherein at least one channel is a remote application programming interface (API) channel, and wherein corresponding log points for the remote API channel comprise one or more of: at a client upon initiating a request to a server, at the server upon receiving the request from the client, at the server upon responding to the request from the client, and at the client receiving the response from the server.

12. A method as in claim 1, wherein the user interface channel comprises a graphical user interface.

13. A method as in claim 1, wherein the user interface channel comprises an audio and/or audiovisual channel.

14. A method as in claim 1, further comprising:
matching a structure defined by the data characterizing a plurality of data accesses of objects at one or more log points with a pre-defined data access log configuration;
wherein the pre-defined data access log configuration specifies the pre-specified attributes to be logged.

15. A method as in claim 1, wherein the receiving, identifying, and logging are implemented by at least one data processor forming part of at least one computing system.

16. A non-transitory computer program product storing instructions which, when executed by one or more hardware data processors forming part of one or more computing systems, result in operations comprising:
receiving, by a data access log framework, data characterizing a plurality of data accesses of objects at one or more log points;
identifying data accesses requiring logging by:
first determining, for each data access by a log writer during runtime, which fields should be logged for the data access to fulfill country specific legal requirements,
second determining, after the first determining, if values should be logged for the determined fields, and
logging the determined fields and the determined values; and
logging one or more pre-specified attributes for each identified data access requiring logging by first logging raw data and subsequently and asynchronously filtering the logged raw data to result in final logging data, the attributes including a purpose of the logging, a configuration key of a filter associated with the logging, and a log domain for grouping semantically identical determined fields; and
determining, using at least one of an automated pattern recognition and a random sampling, that at least one data access in the plurality of data accesses represents an unauthorized data access, and generating an alert indicative of the unauthorized data access, wherein at least one authorization restriction is used to restrict access to at least one logged data access.

17. A system comprising:
one or more data processors; and
memory storing instructions, which when executed by at least one data processor, result in operations comprising:
receiving, by a data access log framework, data characterizing a plurality of data accesses of objects at one or more log points;
identifying data accesses requiring logging by:
first determining, for each data access by a log writer during runtime, which fields should be logged for the data access to fulfill country specific legal requirements,
second determining, after the first determining, if values should be logged for the determined fields, and
logging the determined fields and the determined values; and
logging one or more pre-specified attributes for each identified data access by first buffering the pre-specified attributes in a data buffer and subsequently and asynchronously flushing the buffered pre-specified attributes in the data buffer into a data store, the attributes including a purpose of the logging, a configuration key of a filter associated with the logging, and a log domain for grouping semantically identical determined fields; and
determining, using at least one of an automated pattern recognition and a random sampling, that at least one data access in the plurality of data accesses represents an unauthorized data access, and generating an alert indicative of the unauthorized data access, wherein at least one authorization restriction is used to restrict access to at least one logged data access.

18. A method as in claim 1, wherein log entries corresponding to a same event from the user interface include a same correlation identifier (ID), the correlation ID being indicative of the same behavior of data, corresponding to the log entries, in the user interface and at least another user interface using the data corresponding to the correlation ID.

19. A method as in claim 1, wherein the attributes include at least one data access status being indicative of whether a data access is successful.

* * * * *